July 15, 1930. W. BLASKEWITZ 1,770,566
FIRE POT
Filed Feb. 1, 1928 2 Sheets-Sheet 2
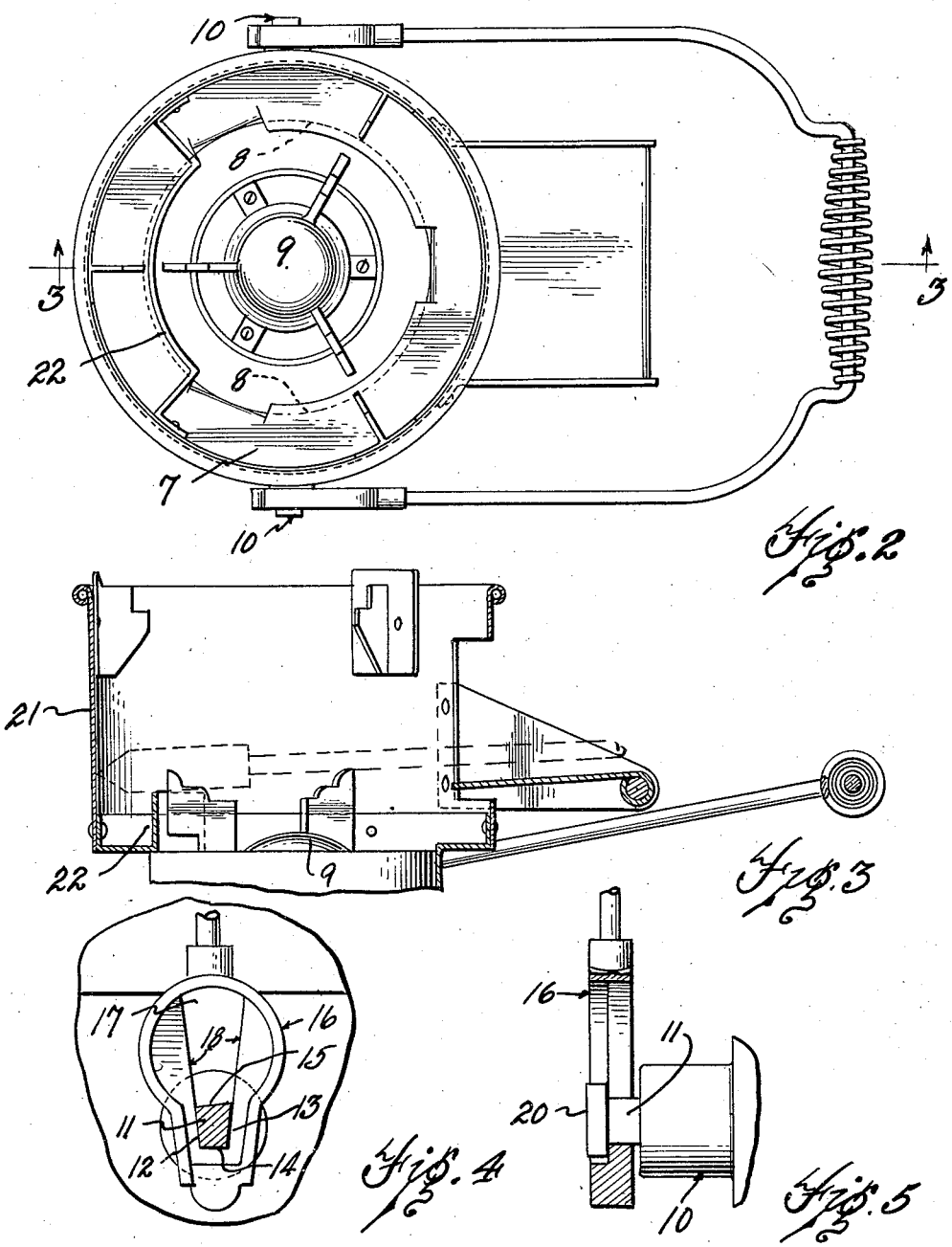
INVENTOR.
WILLIAM BLASKEWITZ
BY
ATTORNEY.

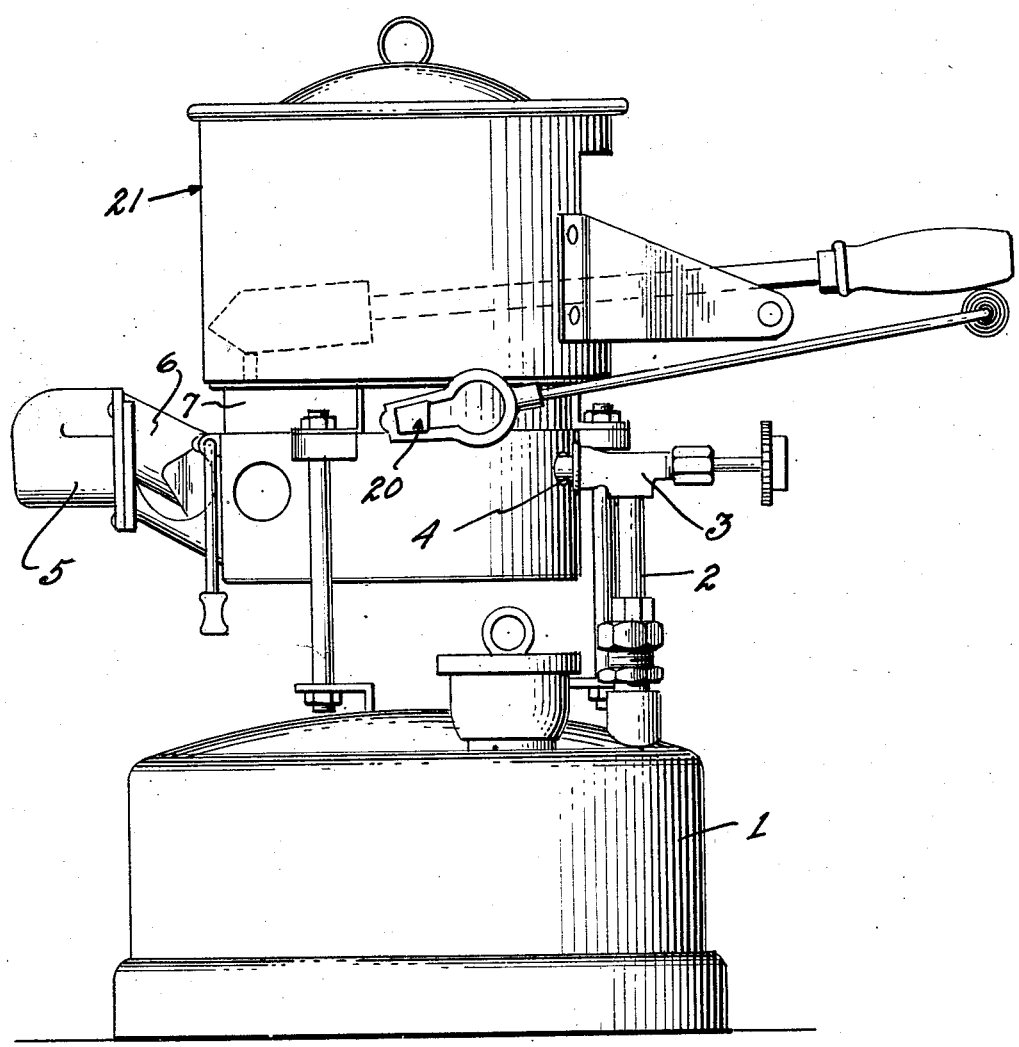

Patented July 15, 1930

1,770,566

UNITED STATES PATENT OFFICE

WILLIAM BLASKEWITZ, OF DETROIT, MICHIGAN, ASSIGNOR, BY MESNE ASSIGNMENTS, TO CLAYTON & LAMBERT MANUFACTURING COMPANY, OF DETROIT, MICHIGAN, A CORPORATION OF DELAWARE

FIRE POT

Application filed February 1, 1928. Serial No. 251,011.

This invention relates to fire pots, and has to do particularly with the provision of simple and compact means forming a part of the fire pot structure for positioning soldering coppers.

Attempts have been made heretofore to design fire pots and handle structure therefor, whereby the handle is adapted to be positioned by certain elements forming a part of the fire pot so as to in a measure position the soldering coppers for heating. Such a structure is disclosed in my copending application #47,938, and another such structure is disclosed in Patent #1,639,938. However, such structures as disclosed by said application and patent have required the providing of special lugs or rests forming a part of the top plate for positioning the handle, and it usually happens in actual practice that such lugs soon become damaged or broken off. Furthermore, because of the very nature of the fire pot structure, and the use of a separate burner and top plate, the soldering coppers have been positioned whereby the points as well as the base of the heads thereof have been directly heated.

It is the object of the present invention to provide a handle structure and supporting lugs therefor, which handle and lugs are so designed and cooperate whereby to inherently position the handle in a plurality of positions. More specifically, the handle supporting lugs are so shaped and so cooperate with the handles as to position such handle either vertically or in a soldering copper supporting position merely by virtue of such cooperation between the lugs and handles, no projecting means or supporting rests being necessary.

A further feature of the present invention has to do with a novel combined structure, comprising a combined top and burner structure, a handle structure supported and positioned by lugs forming a part of the burner structure, and means so positioned on said combined top plate and burner as to position the heel or base of the soldering copper over the flame and to shield the point of the soldering copper during heating.

Other novel features of this invention will be more clearly brought out in the specification as more fully hereinafter described and claimed.

In the drawings:

Fig. 1 is an elevation of a fire pot embodying my novel handle construction and showing the handle positioned to support and properly position the soldering coppers.

Fig. 2 is a plan view of the structure shown in Fig. 1 and showing particularly the annular formation of the combined top and burner, and the means for supporting the heads of the soldering coppers.

Fig. 3 is a fragmentary section taken on line 3—3 of Fig. 2, and illustrating the manner of positioning a soldering copper whereby the base thereof is heated by the annular burner and the point is protected from the intense flame.

Fig. 4 is an enlarged fragmentary view, partly in section, showing the preferred structure of the handle and handle supporting lug, the handle being shown in vertical position.

Fig. 5 is a view similar to Fig. 4 but taken at right angles thereto, the handle being shown in section and illustrating the relative cooperation between the supporting lug and handle.

Fire pot structure embodying the present invention may be generally formed of standard design, and it will be understood that as far as the particular handle supporting and positioning means is concerned that it may be embodied in any type of fire pot of the type adapted to heat soldering coppers. In Fig. 1 I have shown a fire pot having a standard base which may be designated 1, and a suitable fuel conducting conduit 2 for supplying fuel to a suitable valve 3 and a generator tube 4.

The starting and generating apparatus does not form a part of the present invention and suffice it to say that the generator tube 4 is adapted to project vaporized fuel into a suitable conduit 5 from where the mixed vaporized fuel may be conducted by means of the conduit 6 to an annular burner 7. This burner 7 being annular and being positioned above the vaporizing tube, forms a combined burner and top plate, and is preferably provided with an inwardly extending burner member which is indicated in dotted lines, as at 8, and which may consist of any suitable burner structure such as a perforated screen or similar structure. A suitable deflector plate 9 is positioned centrally of this annular burner whereby to deflect the flames from the burner upwardly and centrally thereof.

Carried by this burner member 7, and diametrically positioned at opposite sides thereof, are suitable studs 10. As best shown in Figs. 4 and 5, each stud 10 is provided with a reduced portion 11 which is shaped as shown in Fig. 4. The sides of this polygonally shaped reduced portion 11 may be designated 12 and 13 and are preferably formed at a small angle to the vertical. The bottom side of this portion 11 may be designated 14 and is preferably horizontal, while the top surface 15 is preferably formed at an angle to the horizontal equal to the combined angles of the faces 12 and 13.

The portions of the handle cooperating with the studs 11 may be generally designated 16, anad these members are preferably provided with slots 17 having faces 18 formed at an angle corresponding to the angles formed on the faces 12 and 13 of the stud, the top portion of the slot 17 being large enough to permit the handle to be moved around the studs 11 as an axis. It will thus be seen that if the handle is positioned approximately vertically and then moved upwardly, that the studs 11 will gradually approach the tapered bottom portion of each member 16 whereby to hold the handle in vertical fire-pot supporting position.

In order to utilize the handle as a soldering copper supporting means, it will be obvious that it is only necessary to positively lower the same, revolve it to approximately horizontal position and then pull the handle outwardly whereby the faces 18 will cooperate with the faces 14 and 15 of the stud to position the handle in the positions shown in Figs. 1 and 3. With the faces 14 and 15 so shaped, it will be obvious that the handle will be positioned at an angle slightly above the horizontal, and that in various designs of fire pots the angles given to such faces 14 and 15 might be slightly altered to vary the position of the handle, and consequently of the soldering coppers. The end of each stud 10 is provided with a suitable enlarged portion 20 which serves to keep the handle member 16 in positive position on the studs 10 when in operating position, that is, in vertical or soldering copper supporting position.

A suitable shield 21 is adapted to be positioned over the combined burner and top member 7, and is provided with a suitable opening for receiving the soldering coppers. Adapted to be riveted to or otherwise formed as a part of said shield, is a member 22, best shown in Figs. 2 and 3, which is annular in shape and concentric with the shield 21 and burner 7. Inasmuch as the burner member 7 is annular and the flames therefrom are directed inwardly and upwardly, it will be seen that the member 22 will be well protected from any deteriorating effect of a strong blast of flame. With the handle positioned as shown in Figs. 1 and 3, it will be seen that a soldering copper may be suitably positioned over the burner and that the member 22 will serve to support the head of the soldering copper, the member 22 being so spaced from the wall of the shield 21 whereby the point or end of the head of the soldering copper may be protected from the intense blast of the flame. Thus with this construction, the head of the soldering copper is sufficiently heated without burning or injuring the point, and this desired positioning of the soldering copper is obtained by reason of the cooperation between the handle and the stud 10 in combination with the annular burner and supporting member 22.

What I claim is:

1. Handle construction for fire pots of the type having a fuel tank and burner structure comprising studs mounted on the fire pot and having reduced portions, handle members provided with slots adapted to cooperate with the reduced portions of said studs, two of the opposite walls of said studs being shaped to fit complementally with the handle members to position the handle in one position and the other two walls of said stud shaped to complementally fit said handle members whereby to position the handle in another position.

2. Handle construction for fire pots of the type having a fuel tank and burner structure comprising studs mounted on the fire pot, handle members provided with slots adapted to cooperate with said studs, two of the opposite walls of said studs being shaped to fit complementally with the handle members to position the handle in one position and the other two walls of said stud shaped to complementally fit said handle members whereby to position the handle in another position.

3. Handle construction of the type described, comprising diametrically positioned stud members having reduced portions serving both as journal bearings and positioning means, handle members provided with openings therein adapted to fit over said studs and also provided with tapering slots adapted to complementally fit with the reduced portions of said studs, the reduced portion of said studs being provided with two sets of angularly positioned walls whereby to position the handle in a plurality of positions by the moving of the handle radially outwardly to cause cooperation between the tapered walls of the handle slots and either set of angular walls of the reduced portion of the stud.

4. Fire pot construction comprising in combination a fuel tank and an annular burner member supported thereabove and forming a combined top plate and burner structure, a handle, means integrally formed as a part of the annular burner for positioning the handle in a plurality of positions, said handle in one of said positions serving to support the outer end of the soldering coppers, and shield support means extending upwardly from said annular burner and adjacent the outer circumference thereof to support the ends of the soldering coppers above the top plate and removed from the intense blast of the flame.

5. Fire pot construction comprising in combination a fuel tank and an annular burner member supported thereabove and forming a combined top plate and burner structure, a handle, means carried by the annular burner for positioning the handle in a plurality of positions, said handle in one of said positions serving to support the outer end of the soldering coppers, and means extending upwardly from and supported by said annular burner and adjacent the outer circumference thereof to support the ends of the soldering coppers above the top plate, said last named means being formed in the shape of a shield whereby to protect the ends of the soldering coppers and limit the intense heating thereof to the base.

6. Handle construction for fire pots of the type having a fuel tank and burner structure comprising studs mounted on the fire pot for pivotally receiving handle members, one of said studs being provided with pairs of angularly positioned faces, one of said handle members being provided with a slot adapted to cooperate with the angularly positioned faces on said stud, one pair of the angularly positioned faces on said stud being positioned and shaped to fit complementally with the handle member to position the handle substantially in a vertical position, and another pair of said angular faces on said stud being positioned and shaped to complementally fit said same handle member whereby to position the handle at an angle to the vertical.

7. Handle construction for fire pots of the type having a fuel tank and burner structure, comprising a stud mounted on the fire pot and having reduced portions, a handle member provided with slots adapted to cooperate with the reduced portions of said stud, said stud being provided with angularly positioned walls and two of said walls being oppositely positioned and shaped to fit complementally with the slot of the handle member to position the handle at an angle to the vertical and slightly above the horizontal whereby said handle may be used to support the outer end of soldering coppers.

8. In fire pot construction of the type having a fuel tank and burner, the combination of a handle and a single connecting means between the handle and fire pot, said connecting means having two pairs of angularly positioned faces and said handle being complementally shaped to fit either pair of faces whereby to positively position the handle in vertical carrying position when engaging one pair of faces and in a position for supporting soldering coppers when engaging the other pair of faces.

In testimony whereof I affix my signature.
WILLIAM BLASKEWITZ.